US010029886B2

(12) United States Patent
Polin

(10) Patent No.: US 10,029,886 B2
(45) Date of Patent: Jul. 24, 2018

(54) METHOD AND MECHANISM FOR RELEASING HYDRAULIC ELEVATOR BRAKES

(71) Applicant: Inventio AG, Hergiswil (CH)

(72) Inventor: Urs Polin, Luzern (CH)

(73) Assignee: INVENTIO AG, Hergiswil (CH)

(*) Notice: Subject to any disclaimer, the term of this patent is extended or adjusted under 35 U.S.C. 154(b) by 0 days.

(21) Appl. No.: 15/107,522

(22) PCT Filed: Jan. 22, 2015

(86) PCT No.: PCT/EP2015/051213
§ 371 (c)(1),
(2) Date: Jun. 23, 2016

(87) PCT Pub. No.: WO2015/110509
PCT Pub. Date: Jul. 30, 2015

(65) Prior Publication Data

US 2016/0332844 A1 Nov. 17, 2016

(30) Foreign Application Priority Data

Jan. 23, 2014 (EP) .................................... 14152353

(51) Int. Cl.
*B60T 15/16* (2006.01)
*B66B 5/02* (2006.01)
(Continued)

(52) U.S. Cl.
CPC ................ *B66B 5/027* (2013.01); *B66D 5/14* (2013.01); *B66D 5/26* (2013.01)

(58) Field of Classification Search
CPC ........... B66B 5/027; B66B 5/028; B66D 5/14; B66D 5/26
(Continued)

(56) References Cited

U.S. PATENT DOCUMENTS 4,715,180 A * 12/1987 Rosman ................... B66D 1/08 60/372
5,906,252 A * 5/1999 Wang ....................... A62B 1/02 187/263
(Continued)

FOREIGN PATENT DOCUMENTS

CN 201801263 U 4/2011
CN 102996389 A 3/2013
(Continued)

*Primary Examiner* — Pamela Rodriguez
(74) *Attorney, Agent, or Firm* — William J. Clemens; Shumaker, Loop & Kendrick, LLP

(57) ABSTRACT

A method and a mechanism for releasing a hydraulically actuated elevator brake system wherein the brake release mechanism includes a rotary pump, a crank handle to manually turn the rotary pump, a fluid supply port, a fluid return port, an output port for connection to a cylinder of the brake system, a rapid exhaust valve having an inlet port connected via the rotary pump to the fluid supply port, a cylinder port selectively connectable to the output port, and an exhaust port connected to the fluid return port. By turning the rotary pump, for example with the crank handle, a continuous flow of pressurized hydraulic fluid is delivered through the rapid exhaust valve and onto the brake cylinder, thereby releasing the hydraulic brake system.

17 Claims, 4 Drawing Sheets

(51) Int. Cl.
*B66D 5/14* (2006.01)
*B66D 5/26* (2006.01)

(58) Field of Classification Search
USPC .......... 303/13; 188/161, 163, 158, 171, 173, 188/180, 188, 189, 44, 72.1, 72.2; 187/288, 250, 350, 351, 359, 373
See application file for complete search history.

(56) References Cited

U.S. PATENT DOCUMENTS

| | | | | |
|---|---|---|---|---|
| 6,092,789 | A | 7/2000 | Christopher et al. | |
| 6,273,216 | B1 | 8/2001 | Kocher et al. | |
| 6,494,296 | B2 * | 12/2002 | Lindegger | B66B 1/3492 187/393 |
| 6,516,921 | B1 * | 2/2003 | Wang | B66B 5/027 187/263 |
| 6,817,453 | B2 * | 11/2004 | Koeppe, Jr. | B66B 5/027 188/156 |
| 6,966,409 | B2 * | 11/2005 | Wang | B66B 5/027 187/263 |
| 7,032,714 | B2 * | 4/2006 | Wang | B66B 5/027 187/263 |
| 7,392,885 | B2 * | 7/2008 | Wang | B66B 5/027 187/263 |
| 2005/0103576 | A1 | 5/2005 | Engstrom | |

FOREIGN PATENT DOCUMENTS

| | | | |
|---|---|---|---|
| CN | 202953645 | U | 5/2013 |
| FR | 1465469 | A | 1/1967 |
| GB | 2407554 | A | 5/2005 |

* cited by examiner

METHOD AND MECHANISM FOR RELEASING HYDRAULIC ELEVATOR BRAKES

FIELD

The present disclosure relates to elevators and particularly to a method and mechanism for releasing a hydraulically actuated elevator brake system mounted in conjunction with an electrical motor within an elevator drive. Although, the mechanism can be provided preassembled together with the brake system and motor as a drive for newly planned installations, it is envisaged that the mechanism can also be beneficial for retrofitting or modernizing existing installations.

BACKGROUND

Typically either a drum brake or a disc brake is provided to halt rotation of the motor in traction elevators. In either case, at least one compression spring is generally employed to bias the brake into its closed or braking position and an actuator which is typically electromagnetically, hydraulically or pneumatically driven is provided to overcome the spring bias and move the brake into its open or released position permitting the motor to commence rotation and thereby raise or lower an elevator car along a hoistway. These brakes are regarded as fail-safe systems since if, for example, power is lost to the actuator, the brakes under the influence of the biasing springs automatically assume the braking or closed position.

In such circumstances it is often necessary to evacuate any passengers entrapped within the elevator car. U.S. Pat. No. 6,273,216 B1 describes an emergency release device that enables remote manual release or opening of an electromagnetic elevator drive brake and subsequent manual movement of the elevator car to the next floor of the building by way of the elevator drive. The device is accommodated within a niche positioned alongside the elevator hoistway at a convenient location within the building, such as a landing floor, to enable easy access by service technicians. It includes a handle, typically in the form of bicycle brake lever, together with a rotatable handcrank. On drawing of the handle force is imparted, by way of a cable, to a brake release linkage arranged remotely at the brake of the elevator drive. Through the rotation of the handcrank the elevator motor can likewise be rotated by way of a crown wheel gear transmission, and thus the elevator car can be moved in the desired direction to evacuate any passengers at the nearest landing.

An alternative arrangement is disclosed in GB 2 407 554 A whereby a piston and cylinder arrangement is mounted to actuate the brake release linkage. When evacuation is required a piston pump such as a foot pump or lever operated hand pump is repeatedly operated with intermittent flow to build up pressure in the piston and cylinder arrangement and move the brake release linkage and open the electromagnetic brake. Thereby the elevator car can move slowly in small stages to permit evacuation without activating the car-mounted safety gear.

Generally, it is more practical and economical to use hydraulic elevator drive brakes rather than electromagnetic brakes to provide the necessary, relatively large braking forces associated with drives used in high torque applications such as high-rise or high speed elevator installations. In such instances, it may not be possible to use the manually operated mechanical linkage release mechanisms described above to achieve the forces required to release the hydraulic drive brake. This problem is further compounded by the requirement in the elevator industry to provide redundant braking on all elevator drives accordingly increasing not only the force but also the complexity of the linkage system required to open multiple brakes simultaneously.

If power is lost in a hydraulic braking system, valves within the hydraulic actuator automatically direct or drain fluid from the brake pistons to a reservoir. Accordingly, there is no pressure counteracting the compression spring within the brakes and the brakes assumes their closed or braking position. It has been previously proposed to use a piston pump, such disclosed in GB 2 407 554 A, in an evacuation situation to directly connect to the hydraulic system to build up pressure to overcome the spring bias within hydraulic brakes and thereby release the brakes. However the operator not only has to manually and repeatedly operate the piston pump but must simultaneously manipulate the valves to prevent the hydraulic fluid from draining directly back to the reservoir. This is a difficult if not impossible task and the operator is prone to mechanically jam the valves in their closed position. However such a situation can lead to the brakes remaining uncontrollably open and may lead to accidents. Furthermore, while the intermittent flow from piston pumps is extremely effective at gradually lowering or raising the elevator car to evacuate any passengers at the nearest landing, these systems cannot be used during commissioning for example when it is necessary to keep the brake released for prolonged periods to test the effectiveness of car-mounted safety gears.

SUMMARY

The invention provides a mechanism and method for releasing hydraulic elevator brakes. The brake release mechanism comprises a rotary pump, a crank handle to manually turn the rotary pump, a fluid supply port, a fluid return port, an output port for connection to a cylinder of the brake, and a rapid exhaust valve having an inlet port connected via the rotary pump to the fluid supply port, a cylinder port selectively connectable to the output port, and an exhaust port connected to the fluid return port.

By turning the rotary pump, a continuous flow of pressurized hydraulic fluid is delivered through the rapid exhaust valve and onto the brake cylinder, thereby releasing the hydraulic brake. So long as sufficient pressure is maintained by the rotary pump, the hydraulic brake can be held in this released condition. Accordingly, the brake release mechanism can be used not only to evacuate passengers from an elevator car but also during commissioning by a technician to manually keep the brake released for prolonged periods to test for example the effectiveness of car-mounted safety gears.

If the pump stops rotation, the resulting pressure differential immediately actuates the rapid exhaust valve. Fluid then backflows from the brake cylinder through the cylinder port and drains through the exhaust port of the rapid exhaust valves to the fluid return port of the brake release mechanism.

Preferably, a pressure limiting valve is positioned between the inlet port of rapid exhaust valve and the fluid return port to regulate the pressure of the fluid.

In one example, the crank handle is removable from the rotary pump. Accordingly, when a technician wishes to operate the brake release mechanism in a manual mode, the crank handle can be connected to the rotary pump permitting the technician to manually turn the rotary pump to deliver pressurized hydraulic fluid to the brake cylinder.

Furthermore, the brake release mechanism may additionally include an electric motor to drive the rotary pump in an automatic mode of operation. With this arrangement the brake release mechanism is not only operable in manual mode on a temporary basis, so as to evacuate passengers trapped in an elevator car, but also can provide pressurized fluid to the brake cylinder to release the hydraulic brake system during normal operation in automatic mode.

Preferably, a switch is provided to monitor the position of the crank handle. The switch may monitor whether the crank handle is connected to the rotary pump, thereby signaling or indicating the technician's intention to operate the brake release mechanism in manual mode and simultaneously de-energizing the electric motor. Alternatively, the switch can monitor whether the crank handle is stored at a predetermined storage location such that when the handle is removed from its storage location, again indicating the technician's intention to operate the brake release mechanism manual mode, the motor can be de-energized automatically.

A freewheeling device or equivalent means can be provided on the brake release mechanism to ensure that the motor, when de-energized, does not hinder manual operation of the pump by the crank handle.

The brake release mechanism can have an integrated reservoir communicating directly with the fluid supply and return port. This single compact component provides the entire hydraulic system required to operate the brake during all modes of operation. It is envisioned that such an integrated brake release mechanism would be particularly beneficial with new elevator drive installations.

In another example, the brake release mechanism can be provided with an input port to receive pressurized fluid from an existing brake release actuator. Hence, it is a relatively easy task to retrofit the brake release mechanism into hydraulic circuits between the existing brake release actuator and associated hydraulic brake during modernization of elevator drives.

Preferably, the brake release mechanism includes a hand-operated valve to selectively connect the output port to the input port or to the cylinder port of the rapid exhaust valve. The first of these positions represents automatic mode of operation, whereby hydraulic fluid can be supplied to the brake from the existing brake release actuator. Conversely, the second of these positions represents manual mode of operation, whereby the fluid can be supplied to the brake by manual operation of the rotary pump in the brake release mechanism.

The brake release mechanism can incorporate a switch mounted in conjunction with the hand-operated valve. If the valve is set to manual mode of operation, thereby permitting fluid flow between the rapid exhaust valve and the brake cylinder, the switch can simultaneously output a signal to prevent the existing brake release actuator from unnecessarily supplying pressurized fluid.

DETAILED DESCRIPTION

Figure 1:
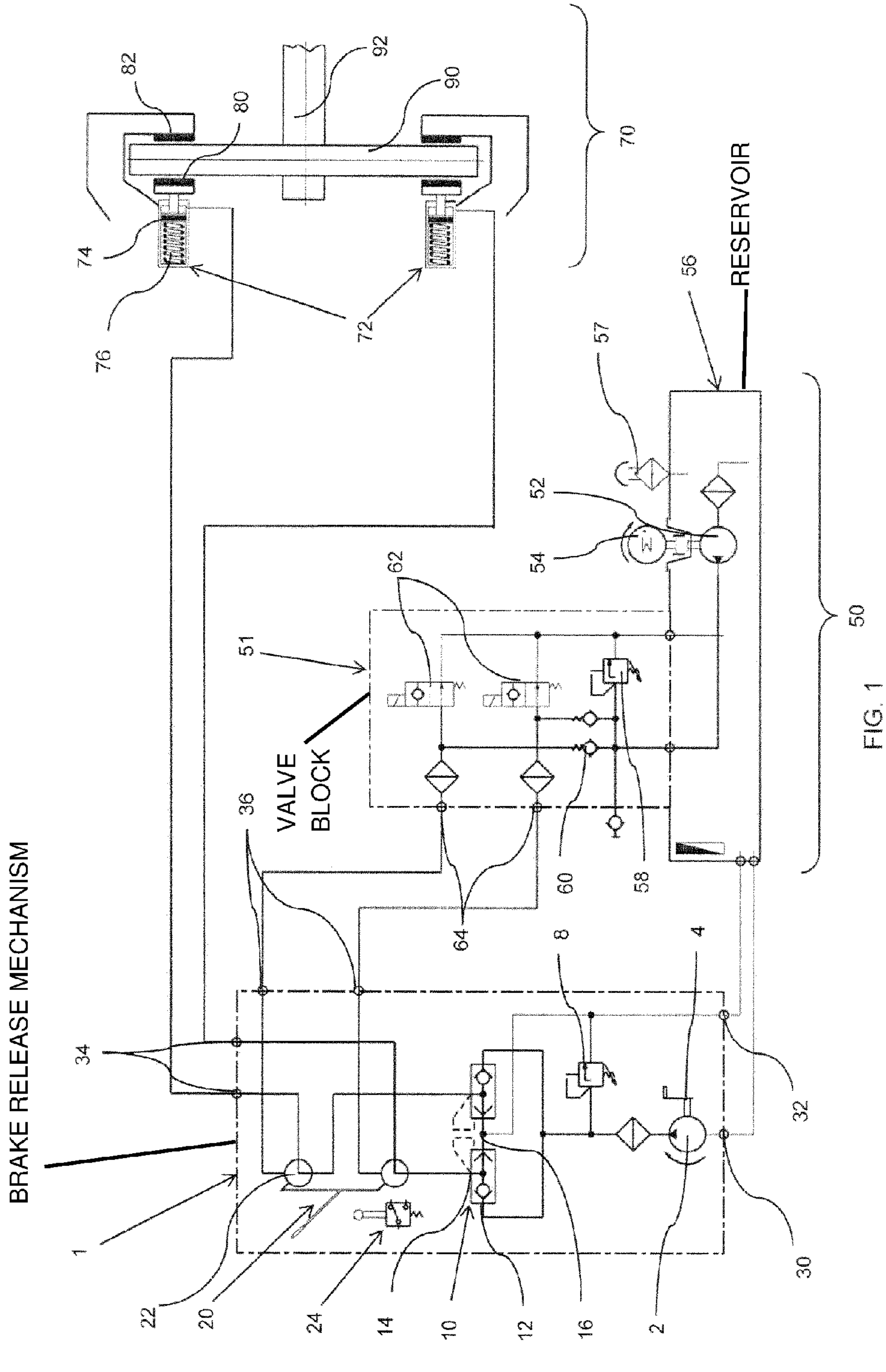
FIG. 1 is a schematic of the hydraulics of a manual brake release mechanism according to the present invention interconnected between an existing hydraulic brake release actuator and associated brake system.
Figure 2:
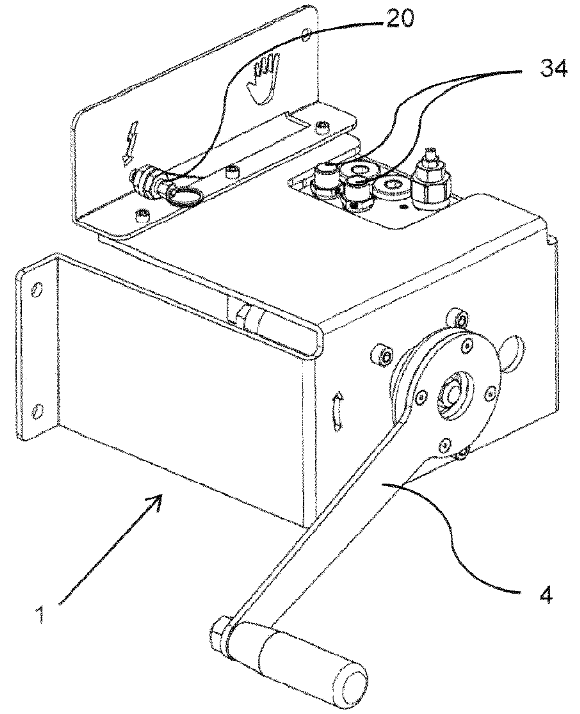
FIG. 2 is a perspective view of the brake release mechanism of FIG. 1.
Figure 3:
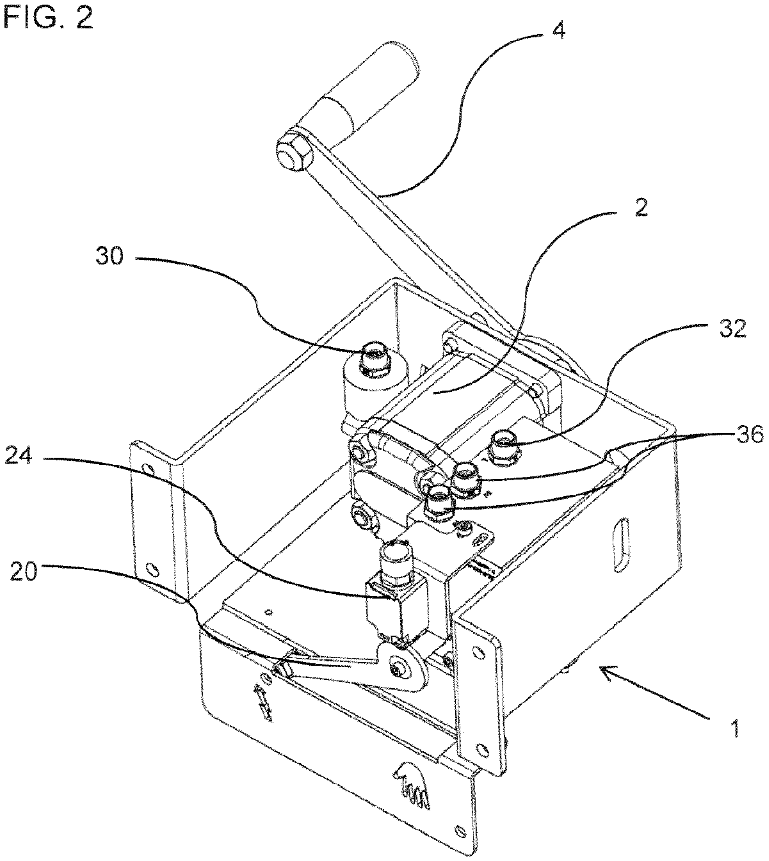
FIG. 3 is a further perspective view of the brake release mechanism of FIG. 1.

FIGS. 1-3 show a brake release mechanism 1 according to the present invention which is designed to be manually operated on a temporary basis, so as to evacuate passengers trapped in an elevator car for example, should an existing brake release actuator 50 fail to deliver sufficient pressure to release an associated hydraulic brake system 70 as can happen during a power outage.

As best illustrated in the schematic FIG. 1, the manual brake release mechanism 1 is located in the hydraulic circuits between the brake release actuator 50 and the hydraulic brake system 70. In the present example two independent hydraulic circuits are employed to feed the brake system 70 as it contains two brake cylinders 72 to satisfy the necessary redundancy braking requirement previously discussed. However, it will be appreciated that the manual brake release mechanism 1 can be designed to accommodate any number of hydraulic circuits. Furthermore, although FIG. 1 is a hydraulic schematic specifically illustrating the brake release mechanism 1 in manual mode, it can also be used in conjunction with the description below to explain how the mechanism 1 functions in the alternative, automatic mode.

The actuator 50 comprises a valve block 51 mounted on a reservoir 56 containing hydraulic fluid. Fluid output ports 64 on the valve block 51 are connected by hydraulic ducts to input ports 36 provided on the manual brake release mechanism 1. In a similar manner, output ports 34 on the manual brake release mechanism 1 are hydraulically connected to the brake cylinders 72.

In normal or automatic operation, an electric motor 54 operates a circulating pump 52 to deliver pressurized fluid from the reservoir 56 through check valves 60. The pressure of the fluid is regulated by a pressure limiting valve 58. Depending on the operating state of 2/2 way solenoid valves 62 within the valve block 51, the pressurized fluid will be either delivered to the outlet ports 64 or alternatively drained back to the reservoir 56.

In an energized state, the pressurized fluid is delivered through the outlet ports 64 of the valve block 51, through the input ports 36 of the manual brake release mechanism 1 and, although not depicted in FIG. 1, diverted therein to the outlet ports 34 and on towards brake cylinders 72. Within each cylinder 72, the pressurized fluid acts on one side of a brake piston 74 to counteract the biasing force of a compression spring 76 acting on the other side of the piston 74. Accordingly as the pressure of the fluid increases, the piston 74 moves to further compress the spring 76 (in the left direction in FIG. 1) and thereby release a piston mounted brake shoe 80 and an opposing brake shoe 82 from engagement with the opposing sides of a brake disc 90 mounted to the motor shaft 92 of an elevator drive. Hence, when the solenoid valves 62 are energized during automatic operation, the hydraulic brake system 70 is released or opened to permit rotation of the motor shaft 92 of the elevator drive.

Conversely, when the solenoid valves 62 are de-energized, any pressurized fluid within the hydraulic circuits is drained back to the reservoir 56. Consequently, the pressure of the fluid with the brake cylinders 72 is no longer sufficient to counteract the biasing force of the compression springs 76 and the brake piston 74 and brake shoes 80, 82 will reassume their original positions to halt rotation of the brake disc 90 and thereby brake the motor shaft 92 of the elevator drive.

Having explained the automatic operation above, the following description will further detail the manual brake release mechanism 1 and how it is used by a technician to manually release the hydraulic brake system 70.

FIGS. 2 and 3 are perspective views of the physical brake release mechanism 1 from above and below, respectively. In addition to the previously described hydraulic input ports 36 from the valve block 51 and output ports 34 to the to the brake cylinders 72, the brake release mechanism 1 also has a fluid supply port 30 and a fluid return port 32, both for connection to the reservoir 56. A crank handle 4 is provided to manually operate a rotary pump 2 within the release mechanism 1. A hand operated slide lever 20 is used to switch the release mechanism 1 from automatic mode for operation, in the position illustrated in FIGS. 2 and 3, to manual mode of operation. A supervisory switch 24 monitors the position of the slide lever 20.

To commence manual operation, the technician slides the lever 20 from the automatic position shown in FIG. 2 to the manual position to the right of the figure. In doing so, the hydraulic circuit shown in FIG. 1 is fully established wherein switchover valves 22 operated by the lever 20 disconnect the input ports 36 from the output ports 34 of the release mechanism 1. Conventionally, the manual mode would be required to evacuate trapped passengers in a power outage, in which case the 2/2 way solenoid valves 62 would automatically assume their de-energized positions returning any pressurized fluid within the actuator 50 back to the reservoir 56. However, in other circumstances, for example during commission testing, power is still available. In those circumstances, a signal from the supervisory switch 24 can be used to ensure that the solenoid valves 62 are in their de-energized positions.

Then, upon manually turning the crank handle 4, the rotary pump 2 delivers a continuous flow of pressurized fluid via the fluid supply port 30 from the reservoir 56 to quick or rapid exhaust valves 10. The pressure of the fluid is regulated by a pressure limiting valve 8. The pressurized fluid is presented to an inlet port 12 of each rapid exhaust valve 10. Once the pressure is sufficient, the rapid exhaust valves 10 actuate to divert the fluid through cylinder ports 14 via the switchover valves 22 and to the output ports 34 where, as before in automatic mode, it is forwarded on towards brake cylinders 72. As the pressure of the fluid increases, the piston 74 moves to further compress the spring 76 (in the left direction in FIG. 1) and thereby release a piston mounted brake shoe 80 and an opposing brake shoe 82 from engagement with the opposing sides of a brake disc 90 mounted to the motor shaft 92 of an elevator drive thereby resulting in brake release.

If the speed at which the crank handle 4 is rotated slows and the pressure of the fluid developed thereby drops to a level at which the pressurized fluid is no longer sufficient to counteract the biasing force of the compression springs 76, then the rapid exhaust valves 10 are actuated such that the inlet ports 12 are closed. Hydraulic fluid then backflows from the brake cylinders 72 through the cylinder ports 14 and drains through exhaust ports 16 in the rapid exhaust valves 10 to the reservoir 56 via the fluid return port 32 of the manual brake release mechanism 1 and the brake system 70 will reclose.

The manual brake release mechanism 1 described with reference to FIGS. 1 to 3 was specifically, but not exclusively designed for modernizing or retrofit existing installations and is relatively easily interconnected in the hydraulic circuits between an existing hydraulic brake release actuator 50 and associated brake system 70.

Figure 4:
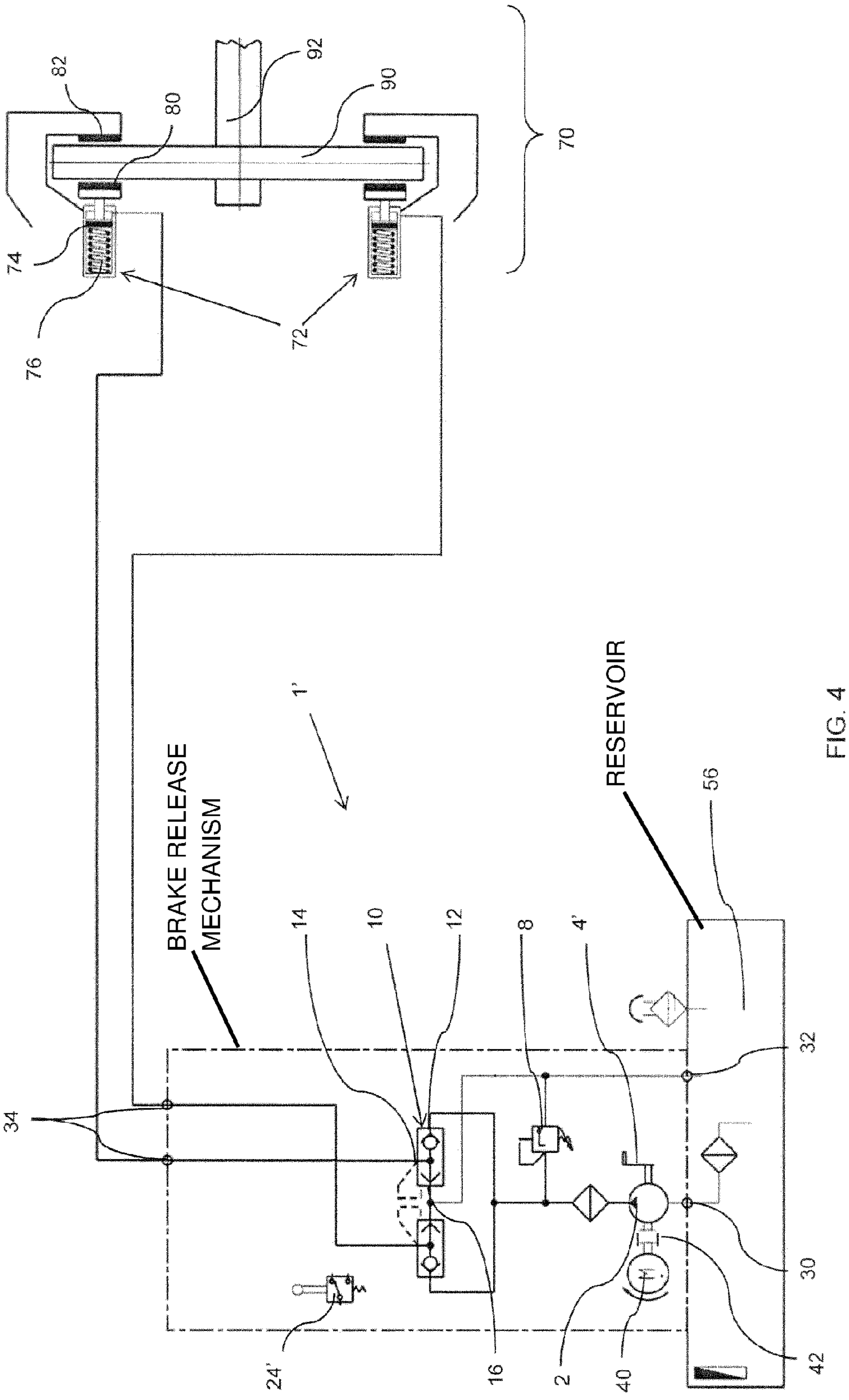
FIG. 4 is a schematic of the hydraulics of a further brake release mechanism according to the present invention.
Figure 5:
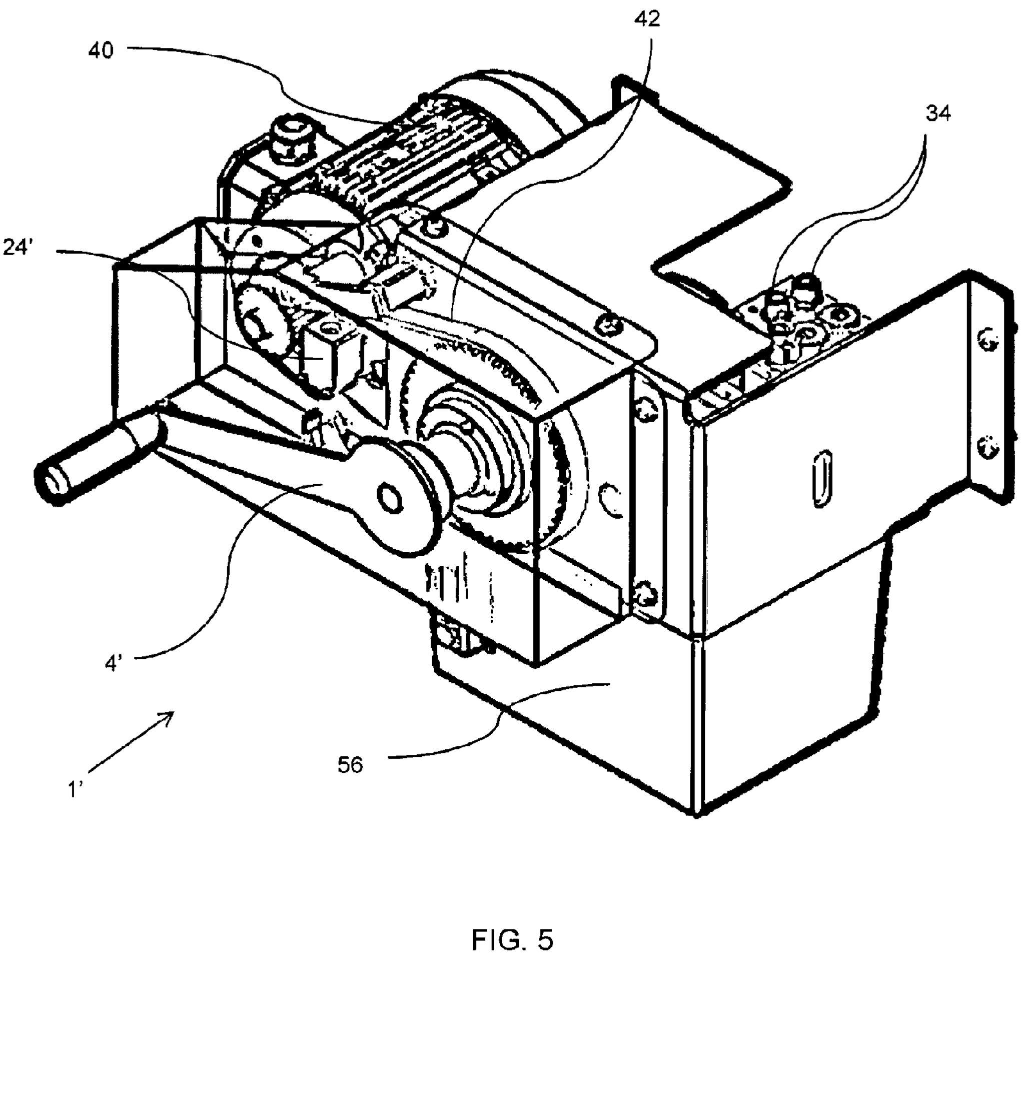
FIG. 5 is a perspective view of the brake release mechanism of FIG. 4.

FIGS. 4 and 5 illustrate an alternative embodiment of the present invention whereby the functions of the separate hydraulic brake release actuator 50 and manual brake release mechanism 1 have been combined into a brake release mechanism 1'. The brake release mechanism 1' is not only operable in manual mode on a temporary basis, so as to evacuate passengers trapped in an elevator car, but also provides pressurized fluid to the cylinders 72 to release the hydraulic brake system during automatic mode.

The brake release mechanism 1' is essentially the same as in the previously described embodiment and therefore, so as to avoid repetition, further explanation of features and functions common to both embodiments is believed unnecessary and incorporated by reference to the description above.

The fluid reservoir 56 in this example is incorporated within the brake release mechanism 1' so that working hydraulic fluid drawn into and drained out of the fluid supply port 30 and fluid return port 32 from the reservoir 56 directly.

Another notable feature of this embodiment is that the crank handle 4' is removable. The supervisory switch 24' can be positioned to actuate when the crank handle 4' is attached or inserted into the rotary pump 2, but more preferably is located so as to monitor whether the detached crank handle 4' is stored at a predetermined storage location. An electric motor 40 is integrated in the brake release mechanism 1' and is coupled by a belt 42 or equivalent means to the rotary pump 2 to effect simultaneous rotation thereof. The motor 40 and its connection 42 to the rotary pump 2 are equipped with a freewheeling device or equivalent means to ensure that the motor 40 when de-energized does not hinder manual operation of the pump 2 by the crank handle 4'.

When the crank handle 4' is detached and stored its predetermined storage location, the brake release mechanism 1' operates in automatic mode whereby the integrated electric motor 40 drives the rotary pump 2 to deliver pressurized hydraulic fluid from the reservoir 56, through the rapid exhaust valves 10, through the output ports 34 and on to the cylinders 72 of the hydraulic brake system 70.

On the contrary, when the crank handle 4' is removed from its storage location or inserted into the rotary pump 2 dependent upon where the supervisory switch 24' is located, the brake release mechanism 1' reverts to manual mode and the motor 40 is automatically de-energized. As in the previous embodiment, the handle 4' once inserted into the rotary pump 2 can be used to release the hydraulic brake system 70.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A brake release mechanism for a hydraulic elevator brake system comprising:

a rotary pump;

a crank handle adapted to manually operate the rotary pump;

a fluid supply port connected to an inlet of the rotary pump;

a fluid return port connected to an outlet of the rotary pump;

an output port connected to the outlet of the rotary pump and adapted for connection to a brake cylinder of the brake system;

a rapid exhaust valve having an inlet port connected via the outlet of the rotary pump to the fluid supply port, a cylinder port connectable to the output port, and an exhaust port connected to the fluid return port; and wherein the rotary pump is operable to provide a continuous flow of pressurized hydraulic fluid through the fluid supply port to the rapid exhaust valve, the rapid exhaust valve diverting the hydraulic fluid through the cylinder port to the output port and to the brake cylinder above a threshold pressure of the hydraulic fluid, and the rapid exhaust valve closing the inlet port below the threshold pressure of the hydraulic fluid.

2. The brake release mechanism according to claim 1 wherein the crank handle is removable from the rotary pump.

3. The brake release mechanism according to claim 2 including a switch monitoring a position of the crank handle.

4. The brake release mechanism according to claim 1 including an electric motor connected to drive the rotary pump.

5. The brake release mechanism according to claim 4 including a freewheeling device connected between the electric motor and the rotary pump wherein the electric motor when de-energized does not hinder manual operation of the rotary pump by the crank handle.

6. The brake release mechanism according to claim 1 including a reservoir connected to the fluid supply port and to the fluid return port.

7. The brake release mechanism according to claim 1 including an input port connected to receive pressurized fluid from a brake release actuator and connected to the output port.

8. The brake release mechanism according to claim 7 including a hand-operated switchover valve selectively connecting the output port alternatively to the input port and to the cylinder port of the rapid exhaust valve.

9. The brake release mechanism according to claim 8 including a switch mounted in conjunction with the hand-operated valve.

10. The brake release mechanism according to claim 1 wherein, so long as a sufficient fluid pressure is maintained by the rotary pump, the brake cylinder is released and, if the rotary pump stops rotation, a resulting pressure differential immediately actuates the rapid exhaust valve to close the brake cylinder.

11. A method for releasing a hydraulic elevator brake system comprising the steps of:

providing a rotary pump and a rapid exhaust valve in a hydraulic circuit connected from a reservoir of hydraulic fluid to a hydraulic brake cylinder of the brake system, a fluid supply port connected to an inlet of the rotary pump, a fluid return port connected to an outlet of the rotary pump, an output port connected to the outlet of the rotary pump and adapted for connection to the brake cylinder of the brake system, and the rapid exhaust valve having an inlet port connected via the outlet of the rotary pump to the fluid supply port, a cylinder port connectable to the output port, and an exhaust port connected to the fluid return port;

providing a crank handle to manually operate the rotary pump;

operating the rotary pump with the crank handle to deliver pressurized hydraulic fluid from the rotary pump through the rapid exhaust valve and onto the brake cylinder; and wherein the rotary pump is operable to provide a continuous flow of the pressurized hydraulic fluid through the fluid supply port to the rapid exhaust valve, the rapid exhaust valve diverting the hydraulic fluid through the cylinder port to the output port and to the brake cylinder above a threshold pressure of the hydraulic fluid, and the rapid exhaust valve closing the inlet port below the threshold pressure of the hydraulic fluid.

12. The method according to claim 11 further including a step of monitoring a position of the crank handle.

13. The method according to claim 12 wherein if the crank handle is removed from a predetermined storage position an electric motor driving the rotary pump is de-energized.

14. The method according to claim 12 wherein if the crank handle is connected to the rotary pump an electric motor driving the rotary pump is de-energized.

15. The method according to claim 11 further including a step of monitoring a hand-operated switchover valve connected between the rapid exhaust valve and the brake cylinder to selectively connect or disconnect a fluid supply therebetween.

16. The method according to claim 15 wherein if the hand-operated valve permits fluid flow between the rapid exhaust valve and the brake cylinder, a signal is output to prevent a brake release actuator from supplying pressurized fluid to the brake cylinder.

17. The method according to claim 11 wherein, so long as a sufficient fluid pressure is maintained by the rotary pump, the brake cylinder is released and, if the rotary pump stops rotation, a resulting pressure differential immediately actuates the rapid exhaust valve to close the brake cylinder.

* * * * *